(12) United States Patent
Matsui

(10) Patent No.: US 7,139,562 B2
(45) Date of Patent: Nov. 21, 2006

(54) REMOTE CONTROL DEVICE

(75) Inventor: Gantetsu Matsui, Nishinomiya (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 219 days.

(21) Appl. No.: 10/663,510

(22) Filed: Sep. 16, 2003

(65) Prior Publication Data

US 2004/0121725 A1    Jun. 24, 2004

(30) Foreign Application Priority Data

Sep. 27, 2002  (JP)  ............................. 2002-283173
Apr. 3, 2003   (JP)  ............................. 2003-100292

(51) Int. Cl.
*H04M 3/00*  (2006.01)

(52) U.S. Cl. ..................... 455/420; 455/418; 455/419; 455/435.1; 455/404.2; 455/456.1; 340/426.13; 340/5.53

(58) Field of Classification Search ................. 455/420, 455/419, 456, 404.2, 456.3, 456.1, 418, 435.1; 340/825.37, 825.4, 426.13, 5.53
See application file for complete search history.

(56) References Cited

U.S. PATENT DOCUMENTS

| 5,435,573 A | 7/1995 | Oakford |
| 5,963,145 A | 10/1999 | Escobosa |
| 6,091,957 A * | 7/2000 | Larkins et al. ............ 455/456.2 |
| 6,339,706 B1 * | 1/2002 | Tillgren et al. ............. 455/419 |
| 6,622,018 B1 * | 9/2003 | Erekson ....................... 455/420 |
| 6,876,310 B1 * | 4/2005 | Dunstan ................ 340/825.49 |

FOREIGN PATENT DOCUMENTS

| EP | 0 462 428 A2 | 5/1991 |
| EP | 0 616 427 A1 | 3/1994 |
| JP | 07123479 A | 5/1995 |
| JP | 2001346270 A | 12/2001 |

* cited by examiner

*Primary Examiner*—Charles Appiah
*Assistant Examiner*—Randy Peaches

(57) ABSTRACT

A remote control device, which controls any of a plurality of apparatuses by transmitting a remote control signal for controlling a target apparatus in response to a user operation, detects a position of the remote control device and generates self-position information indicating the position, and specifies one of the apparatuses that is the closest in distance from the remote control device, as the target apparatus, based on the generated self-position information and a predetermined criterion. When the remote control device detects a user operation, the remote control device transmits a remote control signal corresponding to the detected user operation.

11 Claims, 10 Drawing Sheets

FIG.3

| APPARATUS POSITION DATA 210 | | | |
|---|---|---|---|
| APPARATUS ID 211 | X-COORDINATE 212 | Y-COORDINATE 213 | Z-COORDINATE 214 |
| X0123A (TV) | 20 | 30 | 80 |
| X03967 (VCR) | 20 | 30 | 30 |
| AB970X (LIGHTING A) | 200 | 680 | 300 |
| AB962C (LIGHTING B) | 560 | 680 | 300 |
| C90021 (AIR-CONDITIONER) | 750 | 10 | 250 |

FIG.4

| 220 APPARATUS CONTROL DATA | | | | |
|---|---|---|---|---|
| APPARATUS ID 221 | APPARATUS NAME 222 | FUNCTION NUMBER 223 | FUNCTION NAME 224 | CONTROL DATA 225 |
| X0123A | TV | 1 | POWER ON/OFF | ×××○··· |
| | | 3 | OK | ××××··· |
| | | 4 | BACK | ×××△··· |
| | | 5 | CHANNEL ◄ | △△××··· |
| | | 6 | CHANNEL ► | △△○○··· |
| | | 7 | VOLUME ◄ | ○△··· |
| | | 8 | VOLUME ► | ××··· |
| X03967 | VCR | 1 | POWER ON/OFF | ○○··· |
| | | 2 | PLAYBACK | ○×··· |
| | | 3 | RECORD | △△··· |

FIG.7

APPARATUS ORDER LIST

| ORDER | APPARATUS ID |
|---|---|
| 1 | X0123A(TV) |
| 2 | X03967(VCR) |
| 3 | AB970X(LIGHTING A) |
| 4 | C90021(AIR-CONDITIONER) |
| 5 | AB962C(LIGHTING B) |

REMOTE CONTROL DEVICE

BACKGROUND OF THE INVENTION (1) Field of the Invention

The present invention relates to a remote control device that transmits remote control signals to control various apparatuses, and more specifically, it relates to a remote control device operable to control each of the apparatuses individually.

(2) Description of the Related Art

In recent years, more and more electrical apparatuses, such as audio-video, air-conditioning, and lighting apparatuses, have been provided with a function that enables the apparatuses to be controlled from a distant place using a remote control device designed for each apparatus.

A remote control device designed for one apparatus has a function to send out, according to user operations such as pressing of a button, an infrared or radiowave remote control signal having a waveform predetermined as a command for controlling the apparatus. Accordingly, if the user has the remote control device designed for the apparatus at hand, the usercan controltheapparatus instantlybysuchmeans aspressing the button on the remote control device.

The number of electrical apparatuses having the remote control function, however, has become increasingly larger these days, and it would be inconvenient if the user always has to carry many kinds of remote control devices designed for each of the electrical apparatuses in order to control the electrical apparatuses freely.

Conventionally, there has been a remote control device provided with as many buttons as necessary for controlling more than one apparatus, such as a remote control device having all the buttons to control both a TV and a VCR, for example. Such a remote control device has a lot of buttons, however, and it takes more than a moment for the user to find an appropriate button for a desired function, and therefore it is not very convenient to use such a remote control device. Similarly, a remote control device having a button for switching a target apparatus to be controlled is not very convenient, because using such a remote control device increases a number of times to press buttons for the user operations.

As one solution to such a problem, Japanese Laid-Open Patent Application No. H7-123479 discloses a remote control device operable to transmit remote control signals toward each of a plurality of apparatuses selectively, and has a light receptionunitthatreceives light froma predetermineddirection in the remote control device. The remote control device according to H7-123479 specifies an apparatus as the target apparatus to be controlled by an apparatus identification signal from one of the apparatuses received via the light reception unit, and allocates the remote control signals for controlling the target apparatus to each key on the remote control device.

According to the above-described remote control device, y adjusting the direction of the remote control device so as to receive the apparatus identification signal from a desired apparatus, the user can easily control the desired apparatus.

However, according to the remote control device of H7-123479, which specifies an apparatus as the target apparatus by receiving the apparatus identification signal from the predetermined direction, it could happen in some cases that the user controls an apparatus different from an apparatus that the user has originally intended to control, because the apparatus identification signal can reflect on house walls and such when used inside a house. Moreover, when an apparatus A, an apparatus B, and the remote control device are substantially aligned, and if the remote control device receives the apparatus identification signal from the apparatus B, the user controls the apparatus B using the remote control device even if the user has originally intended to control the apparatus A.

SUMMARY OF THE INVENTION

In view of the above noted problem, an object of the present invention is to provide a remote control device capable of controllingmore than one apparatus without increasing the number of buttons on the remote control device, and allowing a user to adequately specify a desired apparatus and control the apparatus without increasing the number of times to press during operation.

In order to solve the above noted problem, a remote control device according to the present invention, that controls any of a plurality of apparatuses by transmitting a remote control signal for controlling a target apparatus in response to a user operation, comprises a self-position detecting unit operable to detect a position of the remote control device and generate self-position information indicating the position, an apparatus specifying unit operable to specify one of the apparatuses as the target apparatus, based on the generated self-position information and a predetermined criterion, a control operation detecting unit operable to detect a user operation, and a transmitting unit operable to transmit a remote control signal corresponding to the detected user operation.

Further, a computer program according to the present invention, that enables a remote control device to execute a remote control operation for transmitting a remote control signal corresponding to any of a plurality of apparatuses, comprises a self-position detecting step for detecting a position of the remote control device and generate selfposition information indicating the position, an apparatus specifying step for specifying one of the apparatuses as the target apparatus, based on the generated self-position information and a predetermined criterion, a control operation detecting step for detecting a user operation, and a transmitting step for transmitting a remote control signal corresponding to the detected user operation.

By the above remote control device or computer program, the target apparatus to be controlled is selected automatically based on thepositionoftheremote control device. Accordingly, the remote control device need to have only a sufficient number of buttons for controlling a selected apparatus, and it is not necessary to have as many buttons as necessary for controlling all of the apparatuses that the remote control device is capable of controlling. The user may control a desired apparatus via the remote control device by just moving to a particular position that is set for each apparatus, without pressing a particular button to select the desired apparatus.

The remote control device according to the present invention does not specify an apparatus as the target apparatus by such a method in which the remote control device receives an apparatus identification signal from the apparatus, and accordingly, it does not happen that the remote control device specifies a wrong apparatus as the target apparatus due to reflection of the apparatus identification signal on a wall in a house.

A remote control device according to the present invention may also be the remote control device further comprising an apparatus position obtaining unit operable to obtain apparatus position information indicating positions of the apparatuses, wherein the apparatus specifying unit specifies one of the apparatuses as the target apparatus based on the obtained apparatus position information, and the predetermined criterion is a positional relation between the remote control device and each of the apparatuses.

By this, an apparatus is specified as the target apparatus based on the positional relation between the remote control device and each of the apparatuses, and accordingly, the user may control the desired apparatus via the remote control device by moving the remote control device to change the positional relation, without pressing a particular button to select the desired apparatus.

A remote control device according to the present invention may also be the remote control device, wherein the apparatus specifying unit specifies one of the apparatuses as the target apparatus based on a distance between the remote control device and each of the apparatuses, the distance being calculated by referring to the obtained apparatus position information and the generated self-position information.

The distance here is one of a three-dimensional distance and a planar distance.

By this, the user may control the desired apparatus via the remote control device by changing the distance between the desired apparatus and the remote control device.

A remote control device according to the present invention may also be the remote control device, wherein the apparatus specifying unit specifies, as the target apparatus, an apparatus that is closest in distance to the remote control device out of the apparatuses.

The above remote control device is a so-called multi remote control. The remote control device also specifies an apparatus that is the shortest in distance to the remote control device as the target apparatus. Therefore, the user may easily control the desired apparatus by carrying the remote control device near the desired apparatus, without pressing the particular button toselectthedesiredapparatus. Thus, the remote control device focuses more on user needs for capability of controlling each apparatus immediately and freely, using one multi remote control having an interface that is common to more than one apparatus, than needs for capability of controlling the apparatus from a distant place.

As has been described, the remote control device specifies an apparatus based on the distance to each of the apparatuses, and not based on a direction that the remote control device faces. Taking into consideration that the remote control signals can be transmitted in all directions as radiowaves and such, it is not necessary that the user identifies the direction of the remote control device by a shape of a case of the device, and possibilities of case design increase. Therefore, it becomes possible to make the remote control device in a such shape as spherical and cubic, as well as a wearable remote control device that can be attached on an arm.

A remote control device according to the present invention may also be the remote control device further comprising a switch operation detecting unit operable to detect a user operation for switching the target apparatus, wherein, when the switch operation detecting unit detects the user operation for switching the target apparatus after at least one of the apparatuses has already been specified, the apparatus specifying unit newly specifies, as the target apparatus, an apparatus that is next closest in distance to the remote control device with respect to a last specified apparatus, and the remote control signal transmitted from the transmitting unit is for controlling the newly specified apparatus and corresponding to the user operation detected by the controlling operation detecting unit.

By this, the user may easily control the desired apparatus bypressinga target apparatus switch operation button or shaking the remote control device, after moving relatively close to the desired apparatus, without moving the remote control device so as to become the shortest in distance to the desired apparatus.

A remote control device according to the present invention may also be the remote control device further comprising an apparatus information obtaining unit operable to obtain apparatus information corresponding to an apparatus specified as the target apparatus by the apparatus specifying unit, and an image displaying unit operable to display an image, every time the apparatus specifying unit newly specifies one of the apparatuses, based on the apparatus information corresponding to the newly specified apparatus.

By this, the user may identify which apparatus is currently specified as the target apparatus by looking at the image displayed on the remote control device.

A remote control device according to the present invention may also be the remote control device, wherein the apparatus information obtaining unit makes a request to the apparatus for the apparatus information of the apparatus and obtains the apparatus information from the apparatus by communicating with the apparatus specified by the apparatus specifying unit, and the transmitting unit transmits a remote control signal determined based on the obtained apparatus information corresponding to the newly specified apparatus, the remote control signal corresponding to the operation detected by the control operation detecting unit.

By this, the remote control device may receive the information defining the remote control signals for the target apparatus, without storing, in a ROM and such, the remote control signals corresponding to each apparatus in advance. Accordingly, the remote control device is capable of controlling an apparatus that is newly developed or on the market.

A remote control device according to the present invention may also be the remote control device, wherein the switch operation detecting unit detects the user operation for switching the target apparatus by sensing a vibration stronger than a predetermined intensity.

By this, the user may easily control the desired apparatus by shaking the remote control device and giving a vibration of the predetermined intensity, after moving relatively close to the desired apparatus, without moving the remote control device so as to become the shortest in distance to the desired apparatus. It is especially useful, when the remote control device and the control buttons are small, to make it possible that the remote control device switches an apparatus to be controlled by vibration.

A remote control device according to the present invention may also be the remote control device, wherein the self-position information also indicates a facing direction of the remote control device, the facing direction corresponding to a direction in which the transmitting unit transmits the remote control signals mainly, and the apparatus specifying unit specifies, as the target apparatus, an apparatus that is closest in distance to the remote control device out of the apparatuses positioned in an area within a predetermined angle in the facing direction of the remote control device.

By this, the user may adequately control the desired apparatus by pointing the remote control device to the desired apparatus and carrying the remote control device so that the remote control device becomes the shortest in distance to the desired apparatus out of apparatuses that are placed in the facing direction of the remote control device.

A remote control device according to the present invention may also be the remote control device further comprising a record storing unit operable to store an operation history of an apparatus specified as the target apparatus by the apparatus specifying unit, when the control operation detecting unit detects the user operation, wherein according to the operation history stored in the record storing unit, the apparatus specifying unit specifies, as the target apparatus, one of the apparatuses whose distance to the remote control device is closer than a predetermined distance.

By this, it is possible that the remote control device specifies an apparatus the user usually operates by priority as the target apparatus, if the apparatus is close to the remote control device to some extent, and accordingly, it becomes more convenient for the user.

A remote control device according to the present invention may also be the remote control device further comprising a time unit for keeping time, wherein according to the time indicated by the time unit, the apparatus specifying unit specifies, as the target apparatus, one of the apparatuses whose distance to the remote control device is closer than a predetermined distance.

By this, when the user controls an apparatus every day on a regular basis, it is possible that the remote control device specifies and controls the apparatus more quickly.

A remote control device according to the present invention may also be the remote control device, wherein the apparatus position obtaining unit obtains the apparatus position information by receiving position information from each of the apparatuses, the position information indicating the position of the each of the apparatuses, the apparatus position information being a collection of the position information.

By this, the remote control device is capable of operating even an apparatus placed in a house which the remote control device is carried in for the first time, without the user inputting position information of the apparatus directly, because the remote control device receives the position information from the apparatus.

A remote control device according to the present invention may also be the remote control device further comprising an apparatus information obtaining unit operable to obtain operation information corresponding to an apparatus specified as the target apparatus by the apparatus specifying unit, and a display unit operable to display an image based on the operation information.

By this, the user may confirm which apparatus is currently specified as the target apparatus.

A remote control device according to the present invention may also be the remote control device, wherein the self-position obtaining unit generates the self-position information by calculating the position of the remote control device using a GPS function in which radiowaves from GPS satellites are utilized.

By this, because the GPS is utilized to calculate the position of the remote control device, it is not necessary to set up any particular positioning system in a house.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the Drawings:

FIG. 3 illustrates an example of a construction and contents f apparatus position data;

FIG. 4 illustrates an example of a construction and contents f apparatus control data;

FIG. 6A is a top view, and FIG. 6B is a side view;

FIG. 7 illustrates an example of contents of an apparatus order table;

FIG. 8A shows an operation screen for a TV, and FIG. 8B shows an operation screen for an air-conditioner;

FIG. 9A shows an operation screen for a TV, and FIG. 9B shows an operation screen for an air-conditioner.

DESCRIPTION OF THE PREFERRED EMBODIMENT

The following describes a remote control device according to a preferred embodiment of the present invention in reference to the drawings.

[Construction]

Figure 1:
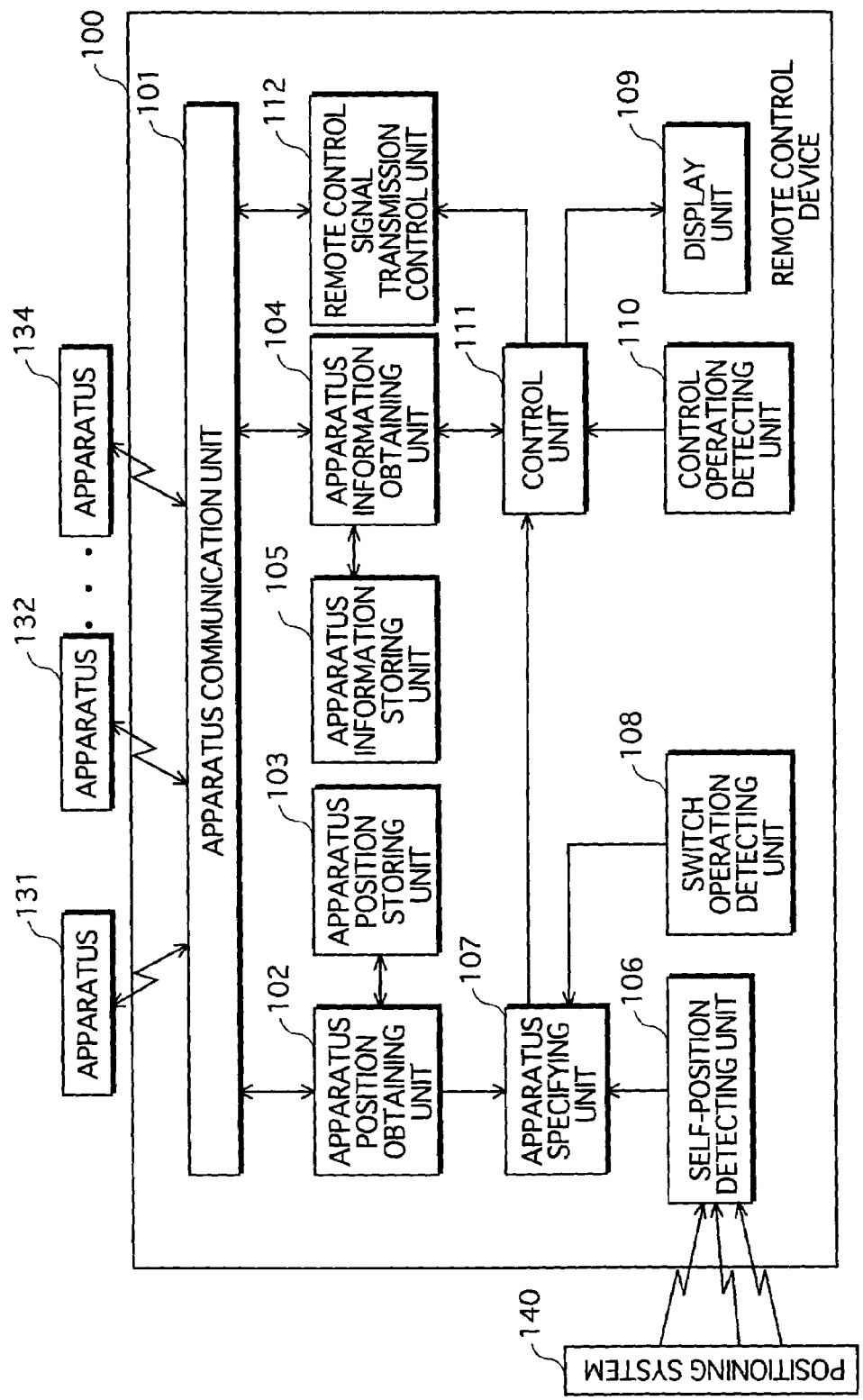
FIG. 1 illustrates a functional block diagram of a remote control device 100 according to an embodiment of the present invention.

FIG. 1 illustrates a functional block diagram of a remote control device 100 according to an embodiment of the present invention. The drawing additionally illustrates an apparatus 131 and the like that can be controlled by the remote control device 100 as well as a positioning system 140 for calculating a position of the remote control device 100.

The remote control device 100, which is a so-called multi-remote controller, includes a case on which a liquid crystal display and more than one button are disposed. The case contains a memory, a processor, an input interface circuit, a circuit for receiving radiowave from the positioning system 140, a communicating circuit for communicating with each apparatus wirelessly, and such.

Functionally, as shown in FIG. 1, the remote control device 100 includes an apparatus communication unit 101, an apparatus position obtaining unit 102, an apparatus position storing unit 103, an apparatus information obtaining unit 104, an apparatus information storing unit 105, a self-position detecting unit 106, an apparatus specifying unit 107, a switch operation detecting unit 108, a display unit 109, a control operation detecting unit 110, a control unit 111, and a remote control signal transmission control unit 112.

The apparatus communication unit 101 is operable to control the communicating circuit so as to communicate with the apparatuses 131, 132, 134, and the like.

The apparatus position obtaining unit 102 is operable to control the apparatus communication unit 101 so as to transmit a signal requesting each of the apparatuses for information about a position of the apparatus and an apparatus ID, receive the information from each of the apparatuses in response to the requesting signal, and update apparatus position data stored in the apparatus position storing unit 103. Details of the apparatus position data are explained later.

The apparatus position storing unit 103 is for storing the apparatus position data and is a part of a nonvolatile memory.

The apparatus information obtaining unit 104 is operable to control the apparatus communication unit 101 so as to transmit a signal requesting a specific apparatus for information for specifying a waveform of a remote control signal necessary to control the specific apparatus and for constructing a operation screen. The apparatus information obtaining unit 104 also receives the information from the specific apparatus in response to the requesting signal, and updates apparatus control data stored in the apparatus information storing unit 105. Details of the apparatus control data are explained later.

The apparatus information storing unit 105 is for storing the apparatus control data, and is a part of a nonvolatile memory.

The self-position detecting unit 106 is operable to detect a current position of the remote control device 100. Specifically, the self-position detecting unit 106 receives signals that are transmitted in sync at a predetermined cycle from each of 3 radiowave sources of the positioning system 140, and calculate the current position of the remote control device 100 from actual time when each signal is received and positions of the 3 radiowave sources that are set in advance.

Figure 2:
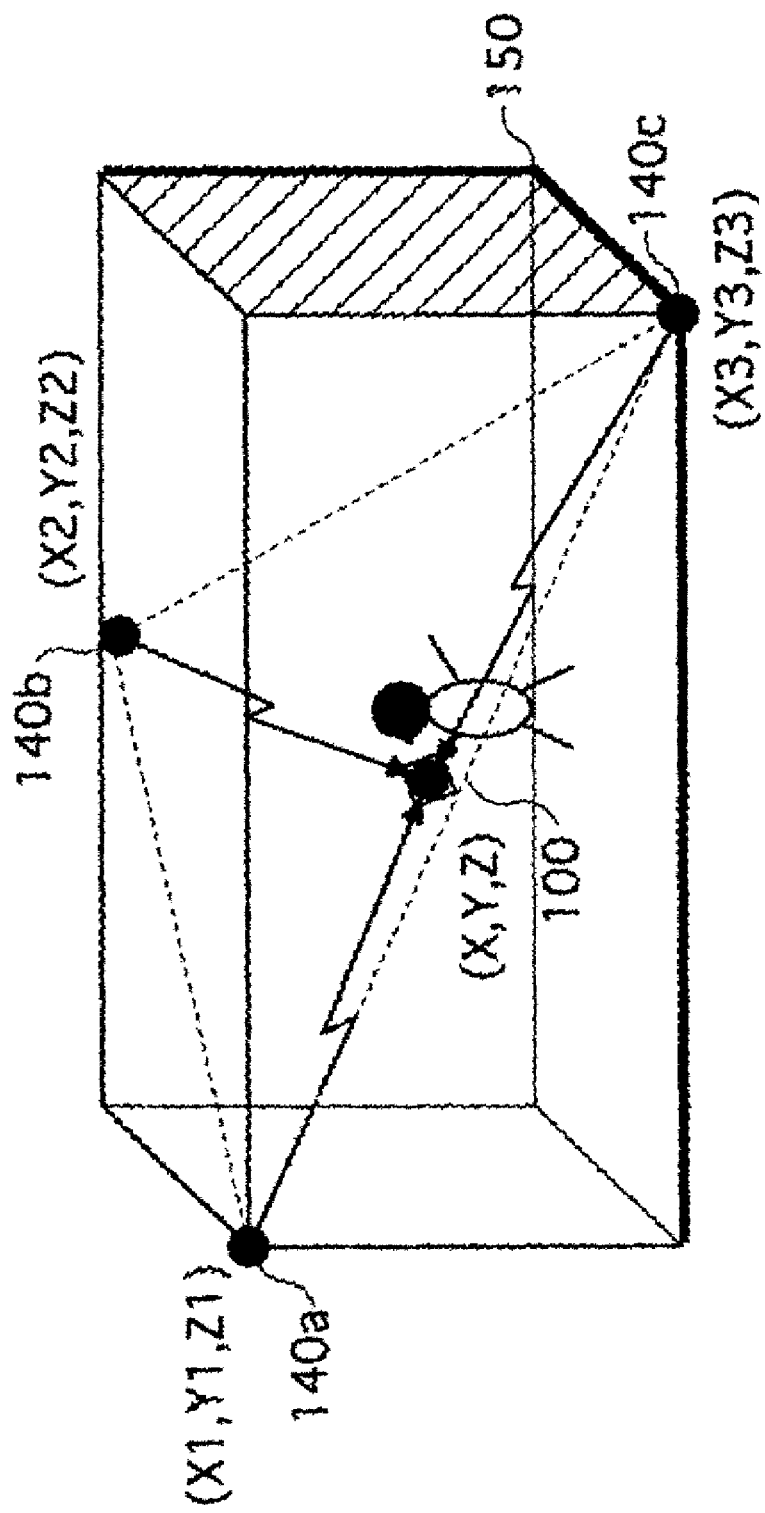
FIG. 2 illustrates a positional relation between each radiowave source of a positioning system 140 and the remote control device 100.

FIG. 2 illustrates a positional relation between each radiowave source of the positioning system 140 and the remote control device 100.

Radiowave sources 140a–140c are, for example, placed at three distant points in a house, and are connected via wire and send out signals at the predetermined cycle in sync. The self-position detecting unit 106 of the remote control device 100 receives the signals and calculates the current position of the remote control device 100. Examples of algorithms that the self-position detecting unit 106 may use in calculating the current position includes an algorithm used in a global positioning system (GPS), where a recipient's current position is calculated by radiowaves received from GPS satellites, for example.

The apparatus specifying unit 107 receives the current position of the remote control device 100 detected by the self-position detecting unit 106, and also receives the apparatus position data stored in the apparatus position storing unit 103 via the apparatus position obtaining unit 102. By comparing the positions, the apparatus specifying unit 107 specifies an apparatus that is the shortest in distance to the remote control device 100, as a target apparatus to be controlled, and notifies the control unit 111 of a result. When the switch operation detecting unit 108 notifies that a switch operation has been performed, the apparatus specifying unit 107 specifies an apparatus that is the next shortest in distance to the remote control device 100, as the target apparatus to be controlled, and notifies the control unit 111 of a result.

When the switch operation detecting unit 108 detects via the input interface circuit that a target apparatus switch operation button, which is disposed on the case of the remote control 100, has been pressed, the switch operation detecting unit 108 notifies the apparatus specifying unit 107 that the switch operation has been performed.

The display unit 109 displays, on the liquid crystal display, an image transmitted from the control unit 111.

When the control operation detecting unit 110 detects a control operation by a user, i.e. when the control operation detecting unit 110 detects, via the input interface circuit, that any of control buttons disposed on the case of the remote control device 100 has been pressed, the control operation detecting unit 110 notifies the control unit 111 of the pressing of the control button as well as which control button has been pressed.

The control unit 111 obtains information, from the apparatus information obtaining unit 104, for specifying waveforms of remote control signals that correspond to the target apparatus of which the apparatus specifying unit 107 has notified, and for constructing the operation screen. Then the control unit 111 generates the image for the operation screen and transmits the image to the display unit 109. When the control operation unit 110 notifies the control unit 111 of the pressing of any of the control buttons, the control unit 111 specifies a remote control signal corresponding to the pressed control button, and notifies the remote control signal transmission control unit 112 to transmit the specified remote control signal.

The remote control signal transmission control unit 112 transmits, via the apparatus communication unit 101, the remote control signal that the control unit 111 notified to transmit.

Each of the above-described functions of the apparatus position obtaining unit 102, the apparatus information obtaining unit 104, the self-position detecting unit 106, the apparatus specifying unit 107, the switch operation detecting unit 108, the display unit 109, the control unit 111, and the remote control signal transmission control unit 112 can be realized by the CPU executing a control program stored in the memory.

[Apparatus Position Data]

The apparatus position data stored in the apparatus position storing unit 103 is explained below.

FIG. 3 illustrates an example of a construction and contents of apparatus position data.

Apparatus position data 210 includes an apparatus ID 211, an x-coordinate 212, a y-coordinate 213, and a z-coordinate 214.

The apparatus ID 211 is an identifier uniquely set for each apparatus. The embodiment is explained given that each apparatus is capable of transmitting its own unique apparatus ID as well as x-y-z coordinates showing its position, upon request of the remote control device 100.

The x-coordinate 212, the y-coordinate 213, and the z-coordinate 214 are numerical values respectively indicating distances to east and to south and a height, in centimeter, from a reference point which is a north-west corner at the level of the floor in a house.

In the example in FIG. 3, the x-y-z coordinates of a TV whose apparatus ID is X0123A shows a point (20, 30, 80).

[Apparatus Control Data]

The apparatus control data stored in the apparatus information storing unit 105 is explained below.

FIG. 4 illustrates an example of a construction and contents of apparatus control data.

Apparatus control data 220 includes an apparatus ID 221, an apparatus name 222, and function numbers 223, function names 224, and control data 225 for each apparatus. The function numbers 223, the function names 224, and the control data 225 correspond to each of functions of a specific apparatus.

The apparatus ID 221 is an identifier set for the each apparatus in advance as with the apparatus ID 211 in the apparatus position data 210.

The apparatus name 222 is text data indicating a name of a specific apparatus. The apparatus name 222 of an apparatus specified by the apparatus specified unit 107 is displayed in the liquid crystal display as a part of the operation screen so that the user may identify the target apparatus.

Each of the function numbers 223 corresponds to each of identification numbers of the control buttons on the case of the remote control device 100. For convenience, the embodiment is explained given that 8 control buttons are disposed on the case of the remote control device 100 and the function numbers take one of 1–8 respectively.

The function names 224 are text data indicating names of specific functions allocated to the buttons that represent the function numbers 223 corresponding to the function names 224. The functionnames 224 of theapparatus specifiedbythe-apparatus specified unit 107 are displayed in the liquid crystal display as a part of the operation screen so that the user may identify which button corresponds to which function.

The control data 225 is information for specifying a waveform of a remote control signal to be transmitted in order that the target apparatus performs a chosen function allocated to one of the control buttons corresponding to one of the function numbers 223.

[Operation]

The remote control device 100 structured as described in the above is detailed below.

Figure 5:
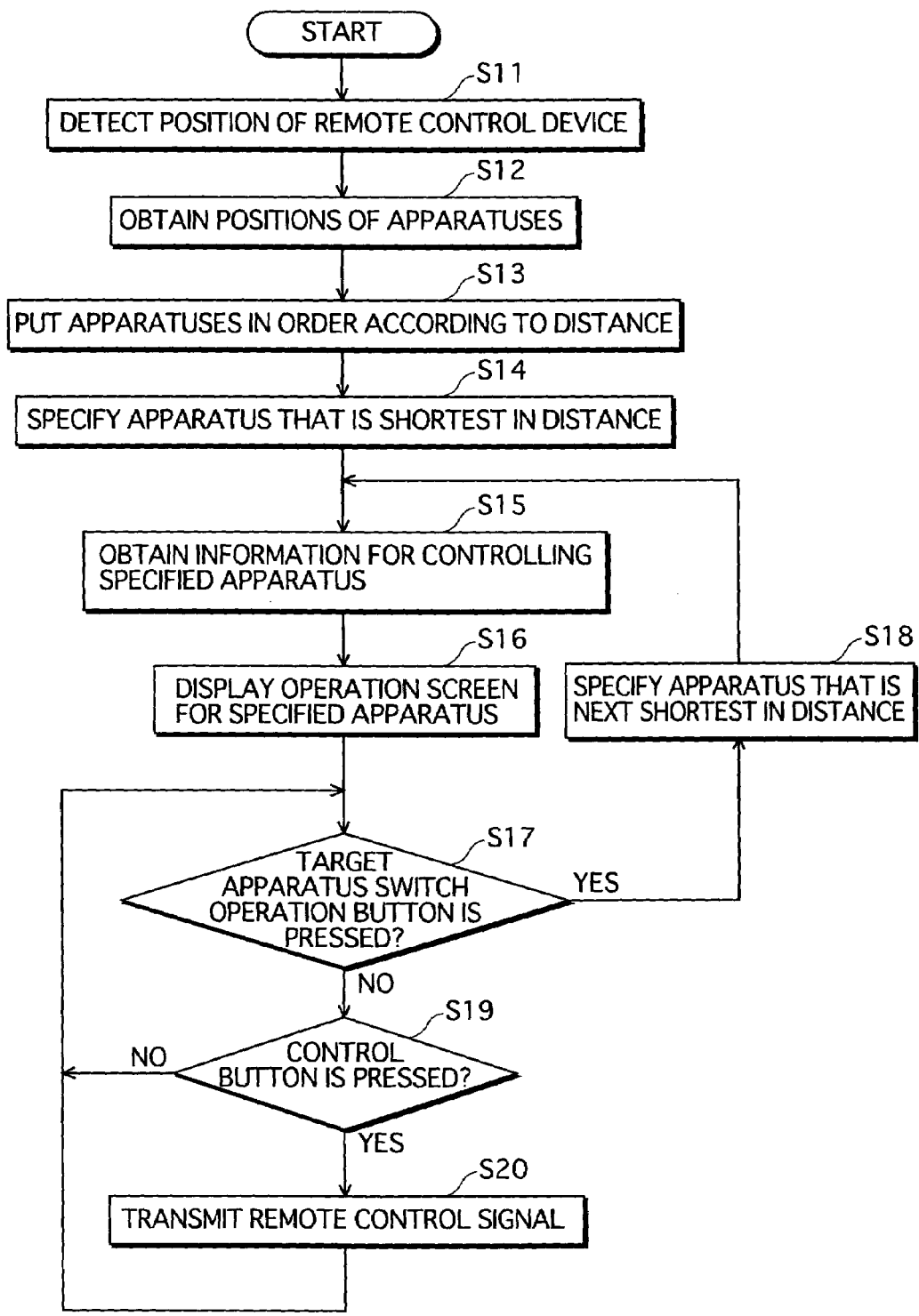
FIG. 5 illustrates a flowchart showing an operation of the remote control device 100.

FIG. 5 illustrates a flowchart showing an operation of the remote control device 100.

Upon turning the power on by pressing a power button, the remote control device 100 starts an operation illustrated in FIG. 5. The remote control device 100 first detects the current position of the remote control device 100 (Step S1). Specifically, the self-position detecting unit 106 of the remote control device 100 receives the signals from radiowave sources of the positioning system 140, calculates the x-y-z coordinates showing the current position of the remote control device 100 based on the received signals.

Further, the remote control device 100 obtains positions of the apparatuses (Step S12). Specifically, the apparatus position obtaining unit 102 of the remote control device 100 transmits signals requesting each of the apparatuses for information about the current position and the apparatus ID via the communication unit 101. The apparatus position obtaining unit 102 adds the information to the apparatus position data stored in the apparatus position storing unit 103 every time the information from each of the apparatuses in response to the requesting signal is received.

Next, the apparatus specifying unit 107 obtains the current position of the remote control device 100 from the self-position detecting unit 106, and also obtains the apparatus position data stored in the apparatus position storing unit 103 via the apparatus position obtaining unit 102. By calculating a distance between the current position of the remote control device 100 and each of the apparatuses, the apparatus specifying unit 107 puts the apparatuses in an order according to the distances and generates an apparatus order list (Step S13). Then, the apparatus specifying unit 107 specifies an apparatus that is the shortest in distance to the remote control device 100 as the target apparatus, and notifies the control unit 111 of the apparatus ID of the target apparatus (Step S14).

Upon reception of the apparatus ID of the apparatus specified by the apparatus specifying unit 107, the control unit 111 notifies the apparatus information obtaining unit 104 of the apparatus ID. In response to the notification, the apparatus information obtaining unit 104 transmits, to the control unit 111, information about the apparatus indicated by the apparatus ID to the control unit 111, if the information has already been stored as the apparatus control data in the apparatus information storing unit 105. If the information is not stored in the apparatus information storing unit 105, the apparatus information obtaining unit 104 specifies the apparatus by the apparatus ID and communicates with the apparatus via the communicating unit 101. The apparatus information obtaining unit 104 then obtains the information which is for specifying a waveform of a remote control signal necessary to control the specific apparatus and for constructing the operation screen, and updates the apparatus control data based on the obtained information and transmits the obtained information to the control unit 111 (Step S15).

After Step S15, based on the information for constructing the operation screen, the control unit 111 generates the image for the operation screen and displays the image in the liquid crystal display via the display unit 109 (Step S16).

Then, if the switch operation detecting unit 108 detects pressing of the target apparatus switch operation button by the user (Step S17), the apparatus specifying unit 107 is notified of the detection, and specifies an apparatus, as the target apparatus, that is the next shortest in direction to the remote control device 100, based on the apparatus order list generated in Step S13, and notifies the control unit 111 of the apparatus ID of the newly specified target apparatus (Step S18). In response to the notification, the control unit 111 repeats the operation from Step S15.

Further, when the pressing of the target apparatus switch operation button has not been detected in Step S17, but the switch operation detecting unit 108 detects the user pressing of any of the control buttons (Step S19), the apparatus specifying unit 107 is notified of the pressing of the button and controls the remote control signal transmission control unit 112 so as to transmit a remote control signal based on the control data 225 contained in the apparatus control data 220 to an apparatus currently specified as the target apparatus to be controlled (Step S20). In the apparatus control data 220, the control data 225 corresponds to one of the function numbers 223 represented by the identification number of the control button that has been pressed by the user.

Either after Step S20 is completed or when the pressing of the control button is not detected in Step S19, the operation of the remote control device 100 returns to Step S17.

Figure 6A:
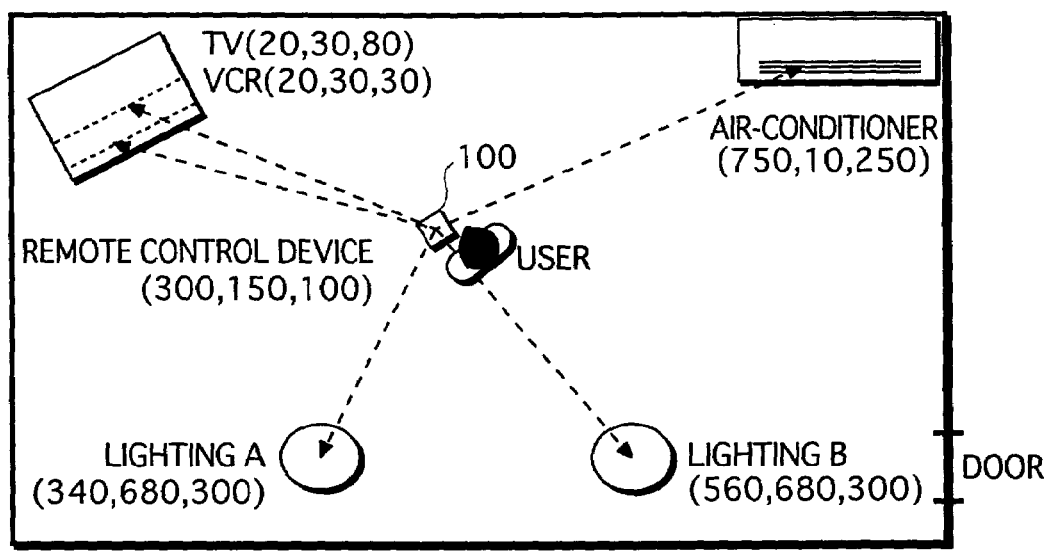
FIGS. 6A and 6B illustrate an example of positions of various apparatuses placed in a room and a remote control device carried by a user.
Figure 6B:
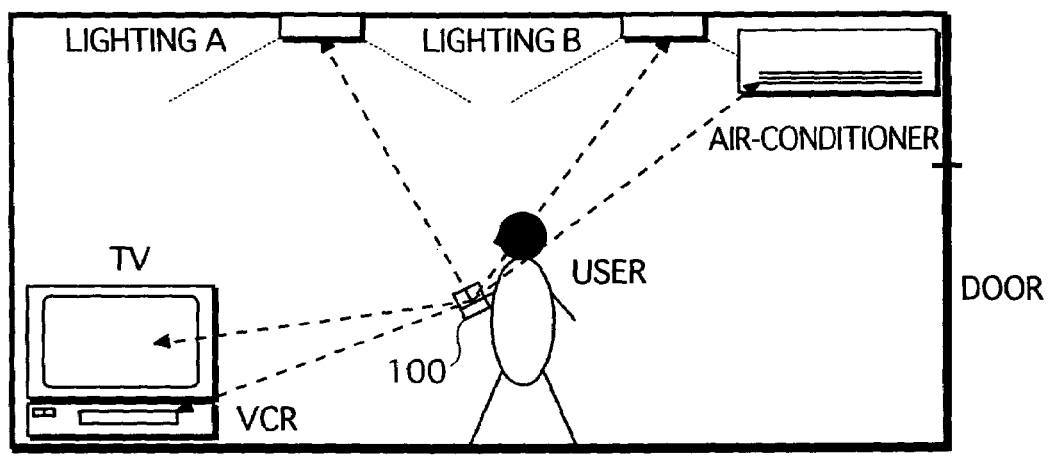

FIGS. 6A and 6B both illustrate an example of the positions of various apparatuses placed in the room and the remote control device carried by the user. In FIGS. 6A and 6B, the right hand of the drawing is the east, and the left hand is the west. FIG. 6A is a top view, and FIG. 6B is a side view viewed from the south The example shown in FIGS. 6A and 6B corresponds to the example of the content of the apparatus position data in FIG. 3.

In the following, a specific operation is explained, when the power button is pressed, given that the remote control device 100 is at a position indicated by x-y-z coordinates (300, 150, 100) as shown in FIGS. 6A and 6B.

When the power button is pressed, the remote control device obtains positions of the remote control device and the apparatuses (Step S11 and Step S12), and then generates the apparatus order list as shown in FIG. 7 (Step S13).

As shown in FIG. 7, the apparatus that is the shortest in distance to the remote control device 100 is a TV. Then, a VCR, a lighting apparatus A, an air-conditioner, and a lighting apparatus B follow in ascending order of distance.

Accordingly, the remote control device 100 specifies the TV that is the shortest in distance to the remote control device 100 as the target apparatus (Step S14), and obtains data necessary for controlling the TV unless the data has already been obtained (Step S15), and displays the operation screen for the TV (Step S16).

Figure 8A:
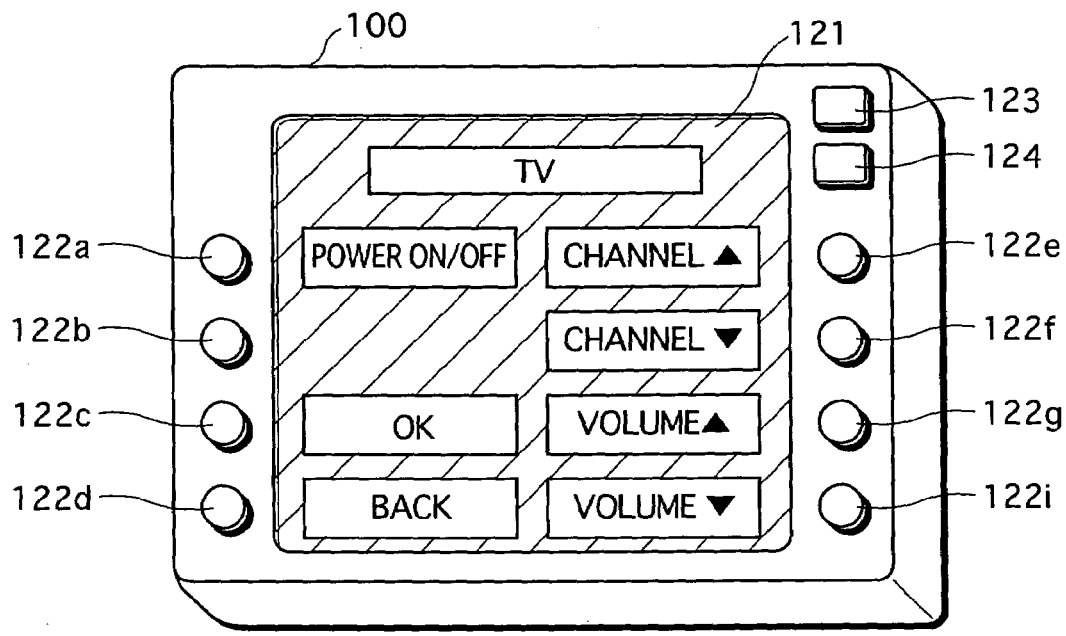
FIGS. 8A and 8B illustrate the remote control device 100 with an operation screen displayed on a liquid crystal display 121.
Figure 8B:
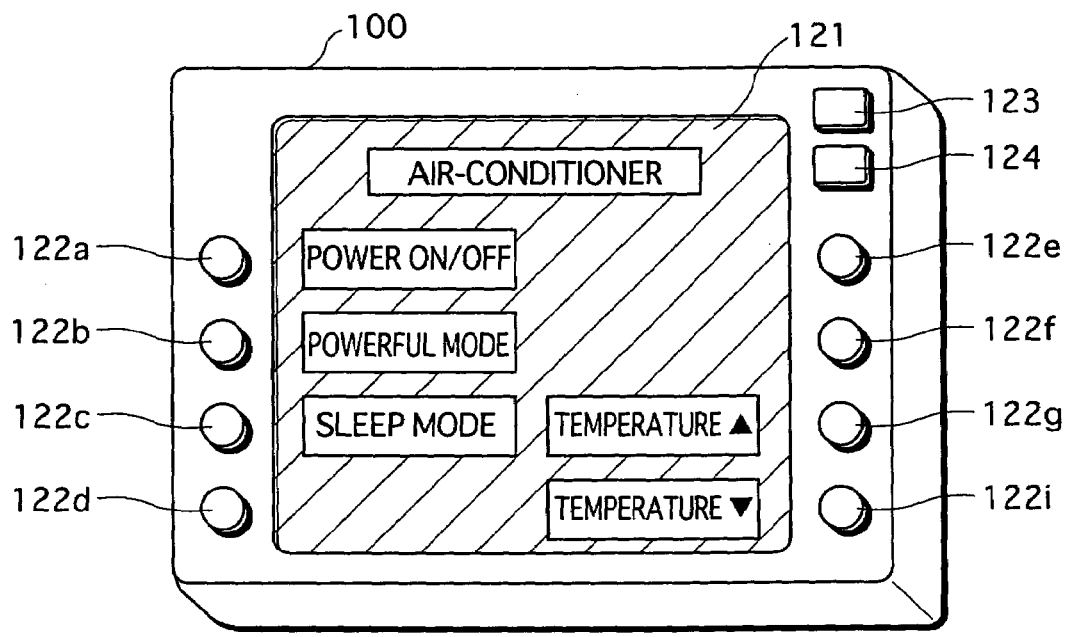

FIGS. 8A and 8B illustrate the remote control device 100 with the operation screen displayed on the liquid crystal display 121. FIG. 8A shows an operation screen for the TV, and FIG. 8B shows an operation screen for the air-conditioner.

When the remote control device 100 is at the position shown in FIGS. 6A and 6B, the operation screen for the TV as shown in FIG. 8A is first displayed in Step S16. The operation screen for the TV is based on the apparatus control data shown in FIG. 4.

Note that, as shown in FIGS. 8A and 8B, the remote control device 100 includes a power button 123, a target apparatus switch operation button 124, and control buttons 122a–122g. The control button 122a corresponds to the function number 1, the control button 122b corresponds to the function number 2, and the control button 122c corresponds to the function number 3, respectively, in the apparatus control data.

After displaying the operation screen for the TV (Step S16), if the user presses the control button 122a, the pressing of the button is detected (Step S19), the remote control device 100 transmits the remote control signal based on the control data 225 that corresponds to the function number 223 representing the number 1 in the apparatus control data 220 (Step S20).

After displaying the operation screen for the TV (Step S16), if the user presses the target apparatus switch operation button, is detected (Step S17), and the remote control device 100 displays the operation screen for the VCR that is the next shortest in distance to the remote control device 100 (Steps S18, S15, and S16). If the target apparatus switch operation button is pressed three times, the remote control device 100 displays the operation screen for the air conditioner as shown in FIG. 8B.

Accordingly, it is possible that the user easily controls the TV by carrying the remote control device near the TV and presses any button for controlling the TV, and if the user carries the remote control device near the air-conditioner and presses any button to control the air-conditioner, the user may easily controls the air-conditioner. In addition, even when the user wishes to control the apparatus that is not the shortest in distance to the current position of the remote control device, the user may control the desired apparatus relatively easily by pressing the target apparatus switch operation button for a necessary number of times, because the operation screen of each apparatus is displayed in the liquid crystal display in an order of the distance to the remote control device every time the target apparatus switch operation button is pressed.

[Variation 1]

The following describes a remote control device 400 as a variation of the remote control device 100 according to the embodiment of the present invention.

Figure 9A:
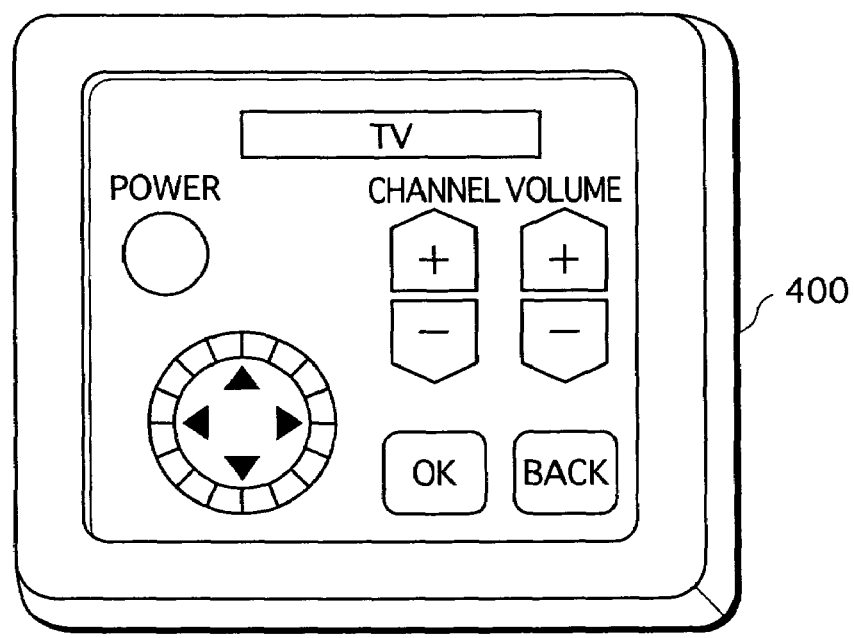
FIGS. 9A and 9B illustrate a remote control device 400 as a variation of the embodiment.
Figure 9B:
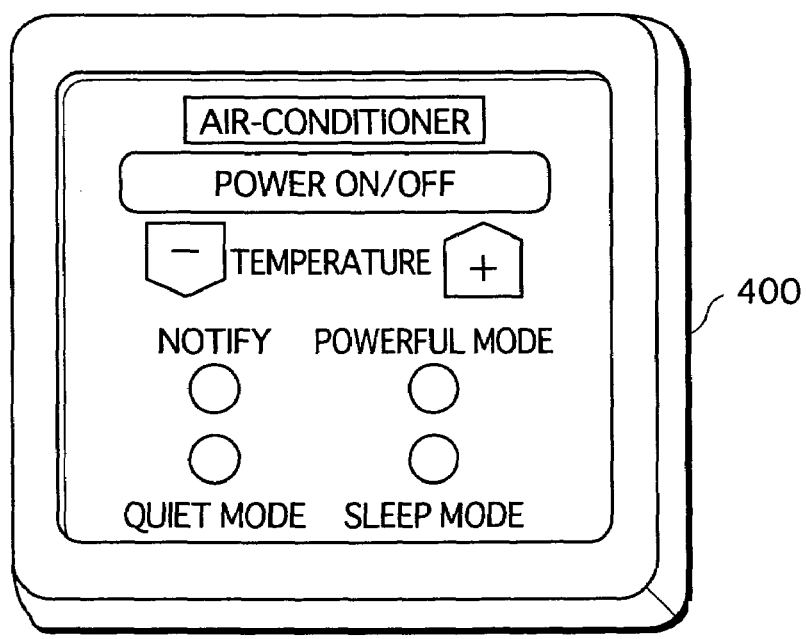

FIGS. 9A and 9B illustrate the remote control device 400.

FIG. 9A shows the operation screen for the TV, and FIG. 9B shows the operation screen for the air-conditioner.

A difference from the remote control device 100 is that the remote control device 400 does not include buttons on a case. The remote control device 400 is provided with a touch panel that detects the position on the panel when the user touches any given part on the panel.

Moreover, the remote control device 400 also includes a sensor that detects a vibration of the case. It is sufficient if the sensor is capable of detecting that the user shakes the case at a vibration stronger than a predetermined intensity. An acceleration sensor can be adopted, for example.

Functional elements of the remote control device 400 are substantially the same with the remote control device 100, and includes the apparatus communication unit 101, the apparatus position obtaining unit 102, the apparatus position storing unit 103, the apparatus information obtaining unit 104, the apparatus information storing unit 105, the self-position detecting unit 106, the apparatus specifying unit 107, the switch operation detecting unit 108, the display unit 109, the control operation detecting unit 110, the control unit 111, and the remote control signal transmission control unit 112 (See FIG. 1). Operations of some of the above units, however, are slightly different from the units in the remote control device 100. The following explains about different parts in the remote control device 400 from the remote control device 100.

The apparatus information storing unit 105 in the remote control device 400 stores the apparatus control data for each of the apparatuses including the apparatus ID and data defining the operation screen for the apparatus, as well as a script for specifying the remote control signal according to the positions on the operation screen that the user specifies via the touch panel. The apparatus control data is obtained from each apparatus by the apparatus information obtaining unit 104 and stored in the apparatus information storing unit 105 in the remote control device 400.

The control operation detecting unit 110 in the remote control device 400 detects the user's operation via the touch panel as the control operation, and detects the position that the user touches on the touch panel, notifies the control unit 111 of the detected position. The control unit specifies the remote control signal corresponding to the position on the touch panel that the user touched by performing the script for the apparatus specified by the apparatus specifying unit 107, and make the remote control signal transmission control unit 112 transmit the remote control signal.

When the switch operation detecting unit 108 in the remote control device 400 detects the vibration stronger than the predetermined intensity via the sensor, i.e that the user shakes the case at the vibration stronger than the predetermined intensity, the switch operation detecting unit 108 notifies the apparatus specifying unit 107 that the switch operation has been performed.

Further, the remote control device 400 starts the operation shown in FIG. 5 not upon pressing of the power button, but starts the operations after Step S12 in FIG. 5 only when, by performing the operation in Step S11 periodically, such as every 15 seconds, to confirm the position of the remote control device 400, the current position of the remote control device 400 has moved more than a predetermined distance, such as 30 cm, since the last confirmation.

Accordingly, if the user carries the remote control device 400 and moves inside the room, the display of the remote control device 400 always shows the operation screen for the apparatus that is the shortest to the remote control device 400 in distance. When the user wishes to control another apparatus that is not the shortest to the remote control device 400 in distance without moving, the operation screen of the another apparatus is shown in the order that is listed in the apparatus order list every time the user shakes the remote control device 400 stronger than the predetermined intensity.

If the user presses the button shown on the liquid crystal display when such an operation screen illustrated in FIG. 9A or 9B is displayed, the remote control device 400 transmits the remote control signal corresponding to the button that has been pressed.

[Variation 2]

The following describes a remote control device 500 as another variation of the remote control device 100 according to the embodiment of the present invention.

Figure 10:
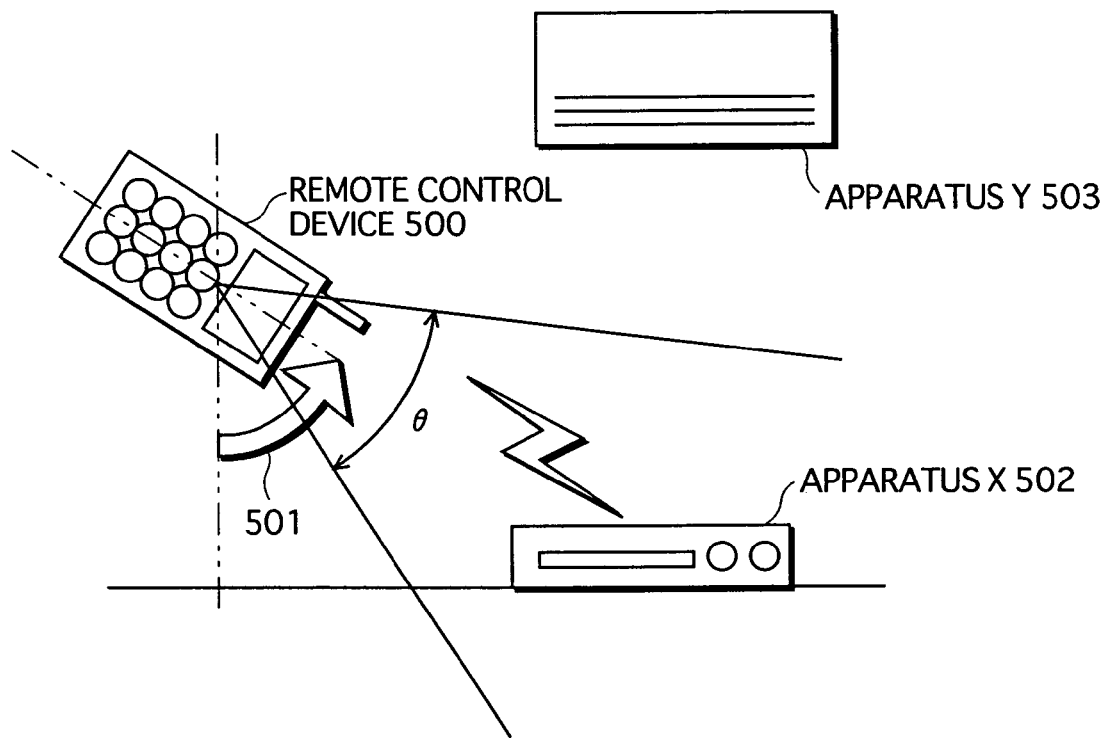
FIG. 10 is a drawing for explanation of an operation of a remote control device 500 as another variation of the embodiment.

FIG. 10 is a drawing for explanation of an operation of the remote control device 500.

The remote control device 500 controls the apparatus by referring to a facing direction of the remote control device, and includes a sensor that detects a direction that a head of the case faces. The case of the remote control device 500 is made rectangular so that the user can easily recognize the facing direction that the remote control device 500.

The sensor for the remote control device 500 may be a sensor that detects the direction of the remote control device 500 based on a direction of gravity and geomagnetism, a sensor that detects the direction of the remote control device 500 based on the positioning system 140 by measuring two points in the case, or the like.

The remote control device 500 is such that the remote control signal is sent out mainly to a straight direction from the head of the remote control device, like a conventional rectangular remote control device designed for a TV and such.

Functional elements of the remote control device 500 are substantially the same with the remote control device 100, and includes the apparatus communication unit 101, the apparatus position obtaining unit 102, the apparatus position storing unit 103, the apparatus information obtaining unit 104, the apparatus information storing unit 105, the self-position detecting unit 106, the apparatus specifying unit 107, the switch operation detecting unit 108, the display unit 109, the control operation detecting unit 110, the control unit 111, and the remote control signal transmission control unit 112 (See FIG. 1). Operations of the self-position detecting unit 106 and the apparatus specifying unit 107, however, are slightly different, as explained below, from the self-position detecting unit 106 and the apparatus specifying unit 107 in the remote control device 100.

The self-position detecting unit 106 detects the facing direction of the remote control device 500 as well as x-y-z coordinates indicating a position of the remote control device 500 by using the positioning system 140.

The apparatus specifying unit 107 receives information about the position and the facing direction of the remote control device 500 detected by the self-position detecting unit 106, receives the apparatus position data stored in the apparatus position storing unit 103 via the apparatus position obtaining unit 102. The apparatus specifying unit 107 also specifies an apparatus that is the shortest in distance to the remote control device 500 as the target apparatus out of apparatuses that are in an area within a predetermined angle θ, such as 60°, in the facing direction of the remote control device 500, and notifies the control unit 111 of the specified apparatus. When the switch operation detecting unit 108 notifies the apparatus specifying unit 107 of the switch operation, the apparatus specifying unit 107 specifies an apparatus that is the next shortest in distance to the remote control device 500 as the target apparatus, and notifies the control unit 111 of the newly specified apparatus.

Accordingly, when the remote control device 500 performs the operation shown in FIG. 5, the apparatus order list generated in Step S13 includes only the apparatus IDs for the apparatuses in the area within the angle θ in the facing direction of the remote control device 500 in ascending order of distance to the remote control device 500. As a result, an operation screen for an apparatus that is not positioned in the facing direction of the remote control device 500 is not selected to be shown in the liquid crystal display.

In the example of FIG. 10, an operation screen for an apparatus X 502, which the remote control device 500 faces, is shown on the liquid crystal display. An operation screen for an apparatus Y 503, however, may not be shown on the liquid crystal display even if the user presses the target apparatus switch operation button.

Although the facing direction of the remote control device 500 detected by the sensor and the area within the angle θ in the facing direction described in the second variation of the embodiment is a direction in three dimensional space, the facing direction of the remote control device 500 may also be a direction either in a vertical plane or in a horizontal plane.

[Complementary Explanation]

In the above explanation, the remote control device according to the present invention is detailed based on the preferred embodiment and the first and second variations of the embodiment. However, such aremote control device can be further modified partially, and the present invention is not restricted to the above described embodiment and variations. Some of the specific examples are given below.

(1) A method in which the remote control device calculates the current position of the remote control device is not restricted to a method using the positioning system 140, and other methods can be employed. For example, it is possible that the remote control device is equipped with a function for receiving signals from the GPS satellites and calculates the position of the remote control device by using the received signals from the GPS satellites instead of using the positioning system 140. This method also enables the remote control device to easily control apparatuses that are positioned separately in a relatively large area. Further, it is also possible that the positioning system 140 includes more than 3 radiowave sources.

(2) The remote control device may also be structured as a mobile phone having a liquid crystal display. By having such a structure, the user may easily control apparatuses around the user by operating the mobile phone that the user always carries. Moreover, the user may also control various apparatuses in various places, such as in a user's house, office, and a friend's house, without carrying any particular device other than the mobile phone.

(3) While the remote control device 100 described in the embodiment receives the information indicating the position and the apparatus ID of each apparatus after the power button is pressed, the remote control device of the present invention may also receive the information by requesting each apparatus when a predetermined button is pressed, regardless of the pressing of the power button.

Further, it is also possible that the user inputs the apparatus position data as shown in FIG. 3 in the remote control device 100 in advance so that the data is stored in the nonvolatile memory, and the remote control device 100 periodically performs the operation shown in FIG. 5 as long as the remote control device 100 is supplied power from batteries. In this case, the information indicating the position and the apparatus ID of each apparatus is not received in Step S12. Instead, the apparatus position obtaining unit 102 reads and obtains the information from the nonvolatile memory, and transmits the information to the apparatus specifying unit 107. The apparatus ID may be an IP address of the apparatus, or the user may decides and inputs the apparatus ID so as to identify each apparatus.

Moreover, the remote control device may collect each element of the apparatus control data (See FIG. 4) of each apparatus through a network such as the Internet. The remote control device may also be such that the remote control device does not receive the apparatus control data from outside of the remote control device, and use a read only memory (ROM) as the apparatus information storing unit 105 and each element of the apparatus control data of many kinds of apparatuses is stored in the ROM in advance.

(4) The remote control device specifies an apparatus as the target apparatus to be controlled based on the relation between the positions of the remote control device and each of the apparatuses, and then transmits the remote control signal to control the target apparatus according to the user operation. The positions of the remote control device and each of the apparatuses are not restricted to three-dimensional positions indicated by x-y-z coordinates, and may be planar positions indicated by x-y coordinates, for example. In this case, an apparatus is specified as the target apparatus based on the positional relation between the remote control device and each of the apparatuses on an x-y plane, such as the distance between the remote control device and the apparatus.

(5) The remote control device may also be such that an apparatus of which the user has pressed the control buttons is recorded in user operation history in the nonvolatile memory, and the apparatus specifying unit 107 first specifies, as the target apparatus, an apparatus that has been most frequently operated by the user out of apparatuses that are placed within a predetermined distance from the remote control device, such as 3 m. Further, the remote control device may also be such that the remote control device identifies each user by an authorization using such as password, the user operation history is stored for each user separately in the nonvolatile memory, and the apparatus specifying unit 107 first specifies, as the target apparatus, an apparatus that has been most frequently operated by the user, who is currently operating the remote control device, out of apparatuses that are placed within a predetermined distance from the remote control device.

Further, it is also possible to set time periods such as "morning", "afternoon", "evening", "night", and the user operation history includes information about the time periods. In this case, the apparatus specifying unit 107 first specifies, as the target apparatus, an apparatus that has been most frequently operated during a time period in which a current time is included, by the user, out of apparatuses that are placed within the predetermined distance from the remote control device. In addition, the remote control device may also store information about in what time period each apparatus is used. In this case, the apparatus specifying unit 107 first specifies based on the information, as the target apparatus, an apparatus that is to be controlled during the current time period out of apparatuses that are placed within a predetermined distance from the remote control device. Moreover, if the target apparatus has a function for receiving broadcasting, the remote control device may also display a program schedule in the liquid crystal display suitable for the current time.

(6) Either infrared rays or radiowaves may be used as the remote control signals for controlling the target apparatus transmitted form the remote control device.

The infrared rays may be emitted in a radial direction instead of only one direction, and the radiowaves may be transmitted without having any particular direction. By doing so, the user does not have to recognize the direction of the remote control device when operating. When an apparatus is specified as the target apparatus by referring to the direction of the remote control device, as shown in the second variation, however, it is preferable that the infrared rays and radiowaves are transmitted mainly in one direction from the case of the remote control device.

(7) A program that enables the CPU to execute the control operations for realizing functions of the remote control device described in the embodiment (See FIG. 5) may be distributed as a recording medium that stores the program or through different kinds of network and such. Examples of such a recording medium include an IC card, an optical disc, a flexible disc, a ROM, and the like. The distributed program may be utilized by being stored in memory and such which is readable by the CPU provided to a portable device. Each of the functions of the remote control device described in the embodiment is realized by the CPU executing the program.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A remote control device that controls any of a plurality of apparatuses by transmitting a remote control signal for controlling a target apparatus in response to a user operation, comprising:

a self-position detecting unit operable to detect a position of the remote control device and generate self-position information indicating the position;

an apparatus specifying unit operable to specify one of the apparatuses as the target apparatus, based on the generated self-position information and a predetermined criterion;

a control operation detecting unit operable to detect a user operation;

a transmitting unit operable to transmit a remote control signal corresponding to the detected user operation;

an apparatus position obtaining unit operable to obtain apparatus position information indicating positions of the apparatuses, wherein the apparatus specifying unit specifies one of the apparatuses as the target apparatus based on (i) a distance between the remote control device and the obtained apparatus position information for each of the apparatuses, the distance being calculated by referring to the obtained apparatus position information and the generated self-position information, and (ii) the predetermined criterion, wherein the predetermined criterion is a positional relation between the remote control device and each of the apparatuses; and wherein the apparatus specifying unit specifies, as the target apparatus, an apparatus that is closest in distance to the remote control device out of the apparatuses;

a switch operation detecting unit operable to detect a user operation for switching the target apparatus, wherein when the switch operation detecting unit detects the user operation for switching the target apparatus after at least one of the apparatuses has already been specified, the apparatus specifying unit newly specifies, as the target apparatus, an apparatus that is next closest in distance to the remote control device with respect to a last specified apparatus, and the remote control signal transmitted from the transmitting unit is for controlling the newly specified apparatus and corresponding to the user operation detected by the controlling operation detecting unit.

2. A remote control device according to claim 1, further comprising:

an apparatus information obtaining unit operable to obtain apparatus information corresponding to an apparatus specified as the target apparatus by the apparatus specifying unit; and an image displaying unit operable to display an image, every time the apparatus specifying unit newly specifies one of the apparatuses, based on the apparatus information corresponding to the newly specified apparatus.

3. A remote control device according to claim 2, wherein the apparatus information obtaining unit makes a request to the apparatus for the apparatus information of the apparatus and obtains the apparatus information from the apparatus by communicating with the apparatus specified by the apparatus specifying unit; and the transmitting unit transmits a remote control signal determined based on the obtained apparatus information corresponding to the newly specified apparatus, the remote control signal corresponding to the operation detected by the control operation detecting unit.

4. A remote control device according to claim 1, wherein the switch operation detecting unit detects the user operation for switching the target apparatus by sensing a vibration stronger than a predetermined intensity.

5. A remote control device that controls any of a plurality of apparatuses by transmitting a remote control signal for controlling a target apparatus in response to a user operation, comprising:

a self-position detecting unit operable to detect a position of the remote control device and generate self-position information indicating the position;

an apparatus specifying unit operable to specify one of the apparatuses as the target apparatus, based on the generated self-position information and a predetermined criterion;

a control operation detecting unit operable to detect a user operation;

a transmitting unit operable to transmit a remote control signal corresponding to the detected user operation;

an apparatus position obtaining unit operable to obtain apparatus position information indicating positions of the apparatuses, wherein the apparatus specifying unit specifies one of the apparatuses as the target apparatus based on (i) a distance between the remote control device and the obtained apparatus position information for each of the apparatuses, the distance being calculated by referring to the obtained apparatus position information and the generated self-position information, and (ii) the predetermined criterion, wherein the predetermined criterion is a positional relation between the remote control device and each of the apparatuses;

wherein the self-position information also indicates a facing direction of the remote control device, the facing direction corresponding to a direction in which the transmitting unit transmits the remote control signals mainly, and the apparatus specifying unit specifies, as the target apparatus, an apparatus that is closest in distance to the remote control device out of the apparatuses positioned in an area within a predetermined angle in the facing direction of the remote control device.

6. A remote control device that controls any of a plurality of apparatuses by transmitting a remote control signal for controlling a target apparatus in response to a user operation, comprising:

a self-position detecting unit operable to detect a position of the remote control device and generate self-position information indicating the position;

an apparatus specifying unit operable to specify one of the apparatuses as the target apparatus, based on the generated self-position information and a predetermined criterion;

a control operation detecting unit operable to detect a user operation;

a transmitting unit operable to transmit a remote control signal corresponding to the detected user operation;

an apparatus position obtaining unit operable to obtain apparatus position information indicating positions of the apparatuses, wherein the apparatus specifying unit specifies one of the apparatuses as the target apparatus based on (i) a distance between the remote control device and the obtained apparatus position information for each of the apparatuses, the distance being calculated by referring to the obtained apparatus position information and the generated self-position information, and (ii) the predetermined criterion, wherein the predetermined criterion is a positional relation between the remote contol device and each of the apparatuses; and a record storing unit operable to store an operation history of an apparatus specified as the target apparatus by the apparatus specifying unit, when the control operation detecting unit detects the user operation, wherein according to the operation history stored in the record storing unit, the apparatus specifying unit specifics, as the target apparatus, one of the apparatuses whose distance to the remote control device is closer than a predetermined distance.

7. A remote control device that controls any of a plurality of apparatuses by transmitting a remote control signal for controlling a target apparatus in response to a user operation, comprising:

a self-position detecting unit operable to detect a position of the remote control device and generate self-posititon information indicating the position;

an apparatus specifying unit operable to specify one of the apparatuses as the target apparatus, based on the generated self-position information and a predetermined criterion;

a control operation detecting unit operable to detect a user operation;

a transmitting unit operable to transmit a remote control signal corresponding to the detected user operation;

an apparatus position obtaining unit operable to obtain apparatus position information indicating positions of the apparatuses, wherein the apparatus specifying unit specifies one of the apparatuses as the target apparatus based on (i) a distance between the remote control device and the obtained apparatus position information for each of the apparatuses, the distance being calculated by referring to the obtained apparatus position information and the generated self-position information, and (ii) the predetermined criterion, wherein the predetermined criterion is a positional relation between the remote control device and each of the apparatuses; and a time unit for keeping time, wherein according to the time indicated by the time unit, the apparatus specifying unit specifies, as the target apparatus, one of the apparatuses whose distance to the remote control device is closer than a predetermined distance.

8. A remote control device for controlling any one of a plurality of apparatuses by transmitting a remote control signal of a predetermined format that activates a selected apparatus in response to a user operation, comprising:

a remote control housing member having user interface controls;

a transmitting unit operatively connected to the user interface controls for transmitting a wireless remote control signal;

a self-position detecting unit in the remote control housing member that detects a spatial location of the remote control device and provides a corresponding signal representative of a physical location; and an apparatus specifying unit for prioritizing, when more than one of the plurality of apparatus are within an operative range of the transmitting unit, one of the plurality apparatus based on the corresponding signal representative of the physical location of the remote control housing member and predetermined criterion entered into the remote control device, wherein a first in order of priority apparatus from the plurality of apparatus has the user interface controls automatically customized to the control characteristics of the first in order of prioritized apparatus and the transmitting unit automatically transmits a wireless remote control signal of a predetermined format for controlling the prioritized apparatus when a user activates the interface controls;

wherein the predetermined criterion provides the spatial locations of the plurality of apparatus within the operative range of the transmitting unit;

wherein the apparatus specifying unit prioritizes those plurality of apparatus within the operating range of the transmitting unit based on the physically closest distance apparatus to the remote device; and a switch operation detecting unit that determines a user input, on the interface controls to automatically switch the remote control device to control an apparatus that is the next shortest in distance to the remote control device in the order of priority from the apparatus specifying unit.

9. A remote control device according to claim 1, wherein the self-position information also indicates a facing direction of the remote control device, the facing direction corresponding to a direction in which the transmitting unit transmits the remote control signals mainly, and the apparatus specifying unit specifies, as the target apparatus, an apparatus that is closest in distance to the remote control device out of the apparatuses positioned in an area within a predetermined angle in the facing direction of the remote control device.

10. A remote control device according to claim 1, further comprising:

a record storing unit operable to store an operation history of an apparatus specified as the target apparatus by the apparatus specifying unit, when the control operation detecting unit detects the user operation, wherein according to the operation history stored in the record storing unit, the apparatus specifying unit specifies, as the target apparatus, one of the apparatuses whose distance to the remote control device is closer than a predetermined distance.

11. A remote control device according to claim 1, further comprising:

a time unit for keeping time, wherein according to the time indicated by the time unit, the apparatus specifying unit specifies, as the target apparatus, one of the apparatuses whose distance to the remote control device is closer than a predetermined distance.

* * * * *